(12) United States Patent
McMullen et al.

(10) Patent No.: US 11,326,428 B2
(45) Date of Patent: May 10, 2022

(54) FLOW THROUGH MAGNETIC DRIVE SYSTEM FOR ARTIFICIAL LIFT (71) Applicant: Upwing Energy, Inc., Cerritos, CA (US)

(72) Inventors: Patrick McMullen, Villa Park, CA (US); Kuo-Chiang Chen, Kennedale, TX (US)

(73) Assignee: Upwing Energy, Inc., Cerritos, CA (US)

(*) Notice: Subject to any disclaimer, the term of this patent is extended or adjusted under 35 U.S.C. 154(b) by 0 days.

(21) Appl. No.: 17/018,090

(22) Filed: Sep. 11, 2020

(65) Prior Publication Data
US 2021/0079772 A1 Mar. 18, 2021

Related U.S. Application Data (60) Provisional application No. 62/900,122, filed on Sep. 13, 2019.

(51) Int. Cl.
E21B 43/12 (2006.01)
H02K 1/20 (2006.01)
H02K 5/02 (2006.01)
H02K 5/132 (2006.01)
F04D 13/08 (2006.01)
F04D 13/10 (2006.01)
F04D 25/06 (2006.01)

(52) U.S. Cl.
CPC ............ *E21B 43/128* (2013.01); *F04D 13/08* (2013.01); *F04D 13/10* (2013.01); *F04D 25/0686* (2013.01); *H02K 1/20* (2013.01); *H02K 5/02* (2013.01); *H02K 5/132* (2013.01)

(58) Field of Classification Search
CPC .... E21B 43/128; F04D 25/0686; F04D 13/08; F04D 13/10; F04D 29/048; F04D 13/0626; F04D 13/0633; F04D 13/0646; H02K 1/20; H02K 5/02; H02K 5/132; H02K 5/1285
See application file for complete search history.

(56) References Cited

U.S. PATENT DOCUMENTS

| 4,026,661 A | 5/1977 | Roeder |
| 4,838,763 A | 6/1989 | Kraemer et al. |
| 5,520,048 A * | 5/1996 | Traina ....................... G01F 1/40 374/148 |
| 5,785,500 A | 7/1998 | Leniek |

(Continued)

FOREIGN PATENT DOCUMENTS

WO 2020142604 7/2020

OTHER PUBLICATIONS

PCT International Search Report and Written Opinion in International Appln. No. PCT/US2020/050401, dated Dec. 4, 2020, 13 pages.

*Primary Examiner* — Charles G Freay
*Assistant Examiner* — Lilya Pekarskaya
(74) *Attorney, Agent, or Firm* — Fish & Richardson P.C.

(57) ABSTRACT

A stator for a downhole-type motor includes a housing. The housing includes a sleeve. The sleeve includes a first layer, a second layer, and a third layer. The first layer is erosion-resistant. The second layer is corrosion-resistant. The third layer can provide structural support. The stator includes a motor stack. The stator can be used to drive a rotor disposed within an inner bore of the housing.

15 Claims, 4 Drawing Sheets (56) References Cited

U.S. PATENT DOCUMENTS

| | | | |
|---|---|---|---|
| 7,575,422 B2* | 8/2009 | Bode | H02K 5/128 |
| | | | 417/423.12 |
| 8,040,007 B2 | 10/2011 | Petrov et al. | |
| 8,384,232 B2 | 2/2013 | Myers et al. | |
| 8,801,361 B2 | 8/2014 | Hawkins | |
| 10,253,606 B1* | 4/2019 | Artinian | E21B 41/02 |
| 10,370,947 B1* | 8/2019 | Artinian | E21B 41/02 |
| 10,385,665 B2 | 8/2019 | McMullen et al. | |
| 10,605,057 B2 | 3/2020 | Huynh et al. | |
| 10,781,668 B2 | 9/2020 | McMullen | |
| 2010/0287427 A1* | 11/2010 | Kim | G06F 11/08 |
| | | | 714/721 |
| 2012/0114510 A1 | 5/2012 | Brown | |
| 2012/0286595 A1* | 11/2012 | Pal | H02K 9/197 |
| | | | 310/54 |
| 2018/0179860 A1 | 6/2018 | McMullen | |
| 2020/0072245 A1* | 3/2020 | Chen | F04D 13/10 |
| 2020/0208509 A1 | 7/2020 | Chen et al. | |
| 2020/0217184 A1 | 9/2020 | Biddick et al. | |

\* cited by examiner

FLOW THROUGH MAGNETIC DRIVE SYSTEM FOR ARTIFICIAL LIFT

CROSS-REFERENCE TO RELATED APPLICATIONS

This application claims the benefit of U.S. Provisional Application No. 62/900,122, filed Sep. 13, 2019, which is hereby incorporated by reference in its entirety.

TECHNICAL FIELD

This disclosure relates to artificial lift.

BACKGROUND

Artificial lift equipment, such as electric submersible pumps, compressors, and blowers, can be used in downhole applications to increase fluid flow within a well, thereby extending the life of the well. Such equipment, however, can fail due to a number of factors. Equipment failure can sometimes require workover procedures, which can be costly. On top of this, workover procedures can include shutting in a well in order to perform maintenance on equipment, resulting in lost production. Lost production negatively affects revenue and is therefore typically avoided when possible.

SUMMARY

Certain aspects of the subject matter described can be implemented as a stator for a downhole-type motor. The stator includes a housing and a motor stack. The housing includes an inner circumferential sleeve that defines an inner bore of the housing within which a rotor of the downhole-type motor can be disposed. The inner circumferential sleeve includes a first layer, a second layer, and a third layer. The first layer and second layer are separated by a first gap. The second layer and third layer are separated by a second gap. The first layer forms an inner circumferential wall of the inner bore of the housing. The first layer is configured to resist erosion. The first layer is configured to be exposed to production fluid flowing through the inner bore of the housing. The second layer is configured to resist corrosion. The second layer and the housing together define an inner volume. The inner volume is flooded with a dielectric fluid. The second layer is configured to isolate production fluid flowing through the inner bore of the housing from the dielectric fluid flooding the inner volume. The third layer is disposed within the inner volume. The third layer is configured to provide structural support. The motor stack is disposed within the inner volume. The motor stack is configured to drive the rotor that is disposed within the inner bore of the housing.

This, and other aspects, can include one or more of the following features. The magnetic bearing is disposed within the inner volume. The stator can include a magnetic bearing disposed within the inner volume. The magnetic bearing can be configured to control a position of the rotor relative to the stator during rotation of the rotor. The first layer can define a first passage configured to allow flow of production fluid through the first layer. The first passage can be configured to prevent flow of solids through the first layer. The third layer can define a second passage configured to allow flow of dielectric fluid through the third layer. The second layer can have a thickness in a range of from 0.004 inches to 0.015 inches. The second layer can be made of Inconel, titanium, or a non-metallic material. The second layer can be welded to the housing. The first layer can be made of ceramic. The third layer can be made of carbon fiber. The motor stack and the magnetic bearing can be potted with thermally conductive material.

Certain aspects of the subject matter described can be implemented as a downhole-type motor. The downhole-type motor includes a rotor and a stator. The rotor includes a permanent magnet. The stator includes a housing and a motor stack. The housing includes a sleeve that defines an inner bore of the housing within which the rotor can be disposed. The sleeve includes a first layer, a second layer, and a third layer. The first layer and second layer are separated by a first gap. The second layer and third layer are separated by a second gap. The first layer forms an inner circumferential wall of the inner bore of the housing. The first layer is configured to resist erosion. The first layer is configured to be exposed to production fluid flowing through the inner bore of the housing. The second layer is configured to resist corrosion. The second layer and the housing together define an inner volume. The inner volume is flooded with a dielectric fluid. The second layer is configured to isolate the production fluid that is flowing through the inner bore of the housing from the dielectric fluid that is flooding the inner volume. The third layer is disposed within the inner volume. The third layer is configured to provide structural support. The motor stack is disposed within the inner volume. The motor stack is configured to drive the rotor.

This, and other aspects, can include one or more of the following features. The stator can include a magnetic bearing disposed within the inner volume. The magnetic bearing can be configured to control a position of the rotor relative to the stator during rotation of the rotor. The stator can be configured to be permanently installed within a well, and the rotor can be retrievable from the well while the stator remains within the well. The first layer can define a first passage configured to allow flow of production fluid through the first layer, and the third layer can define a second passage configured to allow flow of dielectric fluid through the third layer. The first passage can be configured to prevent flow of solids through the first layer. The second layer can have a thickness in a range of from 0.004 inches to 0.015 inches. The second layer can be made of Inconel, titanium, or a non-metallic material. The first layer can be made of ceramic, and the third layer can be made of carbon fiber. The motor stack and the magnetic bearing can be potted with thermally conductive material.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes artificial lift systems. Artificial lift systems installed downhole are often exposed to hostile downhole environments. Artificial lift system failures are often related to failures in the electrical system supporting the artificial lift system. In order to avoid costly workover procedures, it can be beneficial to isolate electrical portions of such artificial lift systems to portions of a well that exhibit less hostile downhole environments in comparison to the producing portions of the well. The subject matter described in this disclosure can be implemented in particular implementations, so as to realize one or more of the following advantages. Use of such artificial lift systems can increase production from wells. In some implementations, the electrical components of the artificial lift system are separated from rotating portions of the artificial lift system, which can improve reliability in comparison to artificial lift systems where electrical systems and electrical components are integrated with both non-rotating and rotating portions. The artificial lift systems described herein can be more reliable than comparable artificial lift systems, resulting in lower total capital costs over the life of a well. The improved reliability can also reduce the frequency of workover procedures, thereby reducing periods of lost production and maintenance costs. Some components of the artificial lift systems described herein (for example, the rotatable components) are retrievable, which can lower costs of workover procedures and mitigate production losses.

Figure 1:
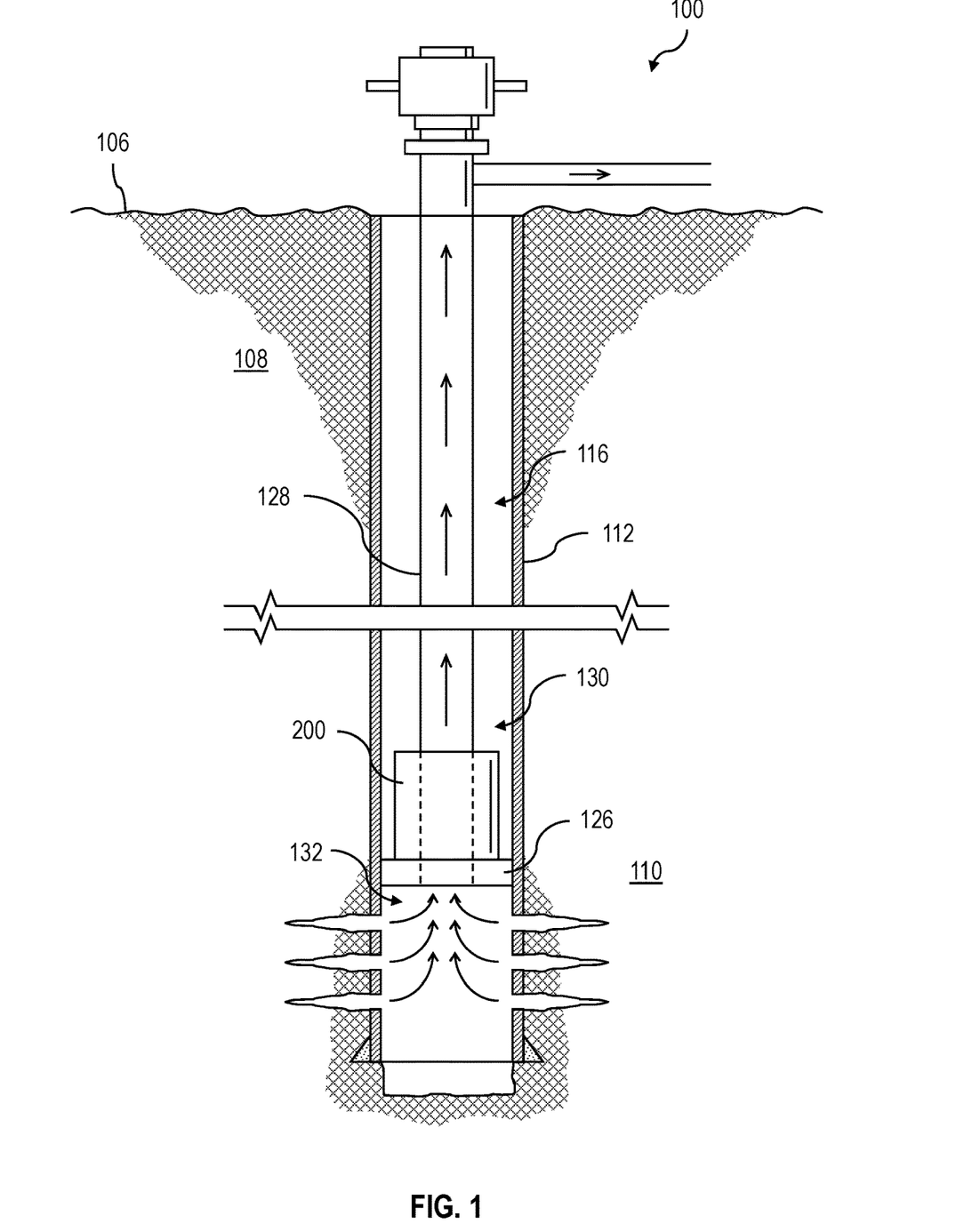
FIG. 1 is a schematic diagram of an example well.

FIG. 1 depicts an example well 100 constructed in accordance with the concepts herein. The well 100 extends from the surface 106 through the Earth 108 to one more subterranean zones of interest 110 (one shown). The well 100 enables access to the subterranean zones of interest 110 to allow recovery (that is, production) of fluids to the surface 106 (represented by flow arrows in FIG. 1) and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other suitable types of formations, including reservoirs that are not naturally fractured in any significant amount. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, the well 100 is a gas well that is used in producing natural gas from the subterranean zones of interest 110 to the surface 106. While termed a "gas well," the well need not produce only dry gas, and may incidentally or in much smaller quantities, produce liquid including oil and/or water. In some implementations, the well 100 is an oil well that is used in producing crude oil from the subterranean zones of interest 110 to the surface 106. While termed an "oil well," the well not need produce only crude oil, and may incidentally or in much smaller quantities, produce gas, water, or both. In some implementations, the production from the well 100 can be multiphase in any ratio. In some implementations, the production from the well 100 can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells, oil wells, or even production wells, and could be used in wells for producing other gas or liquid resources or could be used in injection wells, disposal wells, or other types of wells used in placing fluids into the Earth.

The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly and/or otherwise) end-to-end of the same size or of different sizes. In FIG. 1, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

The wellhead defines an attachment point for other equipment to be attached to the well 100. For example, FIG. 1 shows well 100 being produced with a Christmas tree attached the wellhead. The Christmas tree includes valves used to regulate flow into or out of the well 100. The well 100 also includes an artificial lift system 200 (for example, an electric submersible pump (ESP)) residing in the wellbore, for example, at a depth that is nearer to subterranean zone 110 than the surface 106. The system 200, being of a type configured in size and robust construction for installation within a well 100, can include any type of ESP that can assist production of fluids to the surface 106 and out of the well 100 by creating an additional pressure differential within the well 100. Also, notably, while the concepts herein are discussed with respect to an ESP, they are likewise applicable to other types of pumps, compressors, blowers and devices for moving multiphase fluid.

Figure 2:
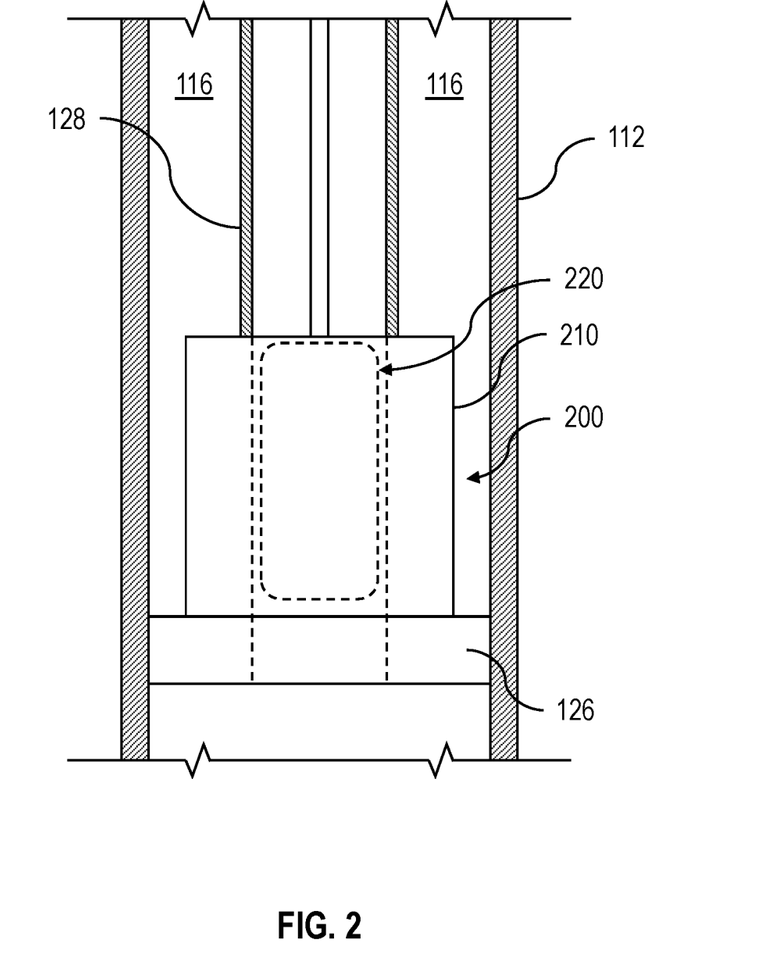
FIG. 2 is a schematic diagram of an example artificial lift system within the well of FIG. 1.

In particular, casing 112 is commercially produced in a number of common sizes specified by the American Petroleum Institute (the "API"), including 4½, 5, 5½, 6, 6⅝, 7, 7⅝, 16/8, 9⅝, 10¾, 11¾, 13⅜, 16, 11⁶/8 and 20 inches, and the API specifies internal diameters for each casing size. The system 200 can be configured to fit in, and (as discussed in more detail below) in certain instances, seal to the inner diameter of one of the specified API casing sizes. Of course, the system 200 can be made to fit in and, in certain instances, seal to other sizes of casing or tubing or otherwise seal to a wall of the well 100. As shown in FIGS. 1 and 2, the ESP 200 can attach to a production tubing 128 in the well 100. Portions of the system 200 do not need to reside within the tubing 128 and can have dimensions that are larger than the inner diameter of the tubing 128. The largest outer diameter of the system 200 can therefore be larger than the inner diameter of the tubing 128.

Additionally, the construction of the components of the system 200 are configured to withstand the impacts, scraping, and other physical challenges the system 200 will encounter while being passed hundreds of feet/meters or even multiple miles/kilometers into and out of the well 100. For example, the system 200 can be disposed in the well 100 at a depth of up to 20,000 feet (6,096 meters). Beyond just a rugged exterior, this encompasses having certain portions of any electrical components being ruggedized to be shock resistant and remain fluid tight during such physical challenges and during operation. Additionally, the system 200 is configured to withstand and operate for extended periods of time (e.g., multiple weeks, months or years) at the pressures and temperatures experienced in the well 100, which temperatures can exceed 400° F./205° C. and pressures over 2,000 pounds per square inch, and while submerged in the well fluids (gas, water, or oil as examples). Finally, the system 200 can be configured to interface with one or more of the common deployment systems, such as jointed tubing (that is, lengths of tubing joined end-to-end, threadedly and/or otherwise), sucker rod, coiled tubing (that is, not-jointed tubing, but rather a continuous, unbroken and flexible tubing formed as a single piece of material), slickline (that is, a single stranded wire), or wireline with an electrical conductor (that is, a monofilament or multifilament wire rope with one or more electrical conductors, sometimes called e-line) and thus have a corresponding connector (for example, a jointed tubing connector, coiled tubing connector, or wireline connector).

A seal system 126 integrated or provided separately with a downhole system, as shown with the system 200, divides the well 100 into an uphole zone 130 above the seal system 126 and a downhole zone 132 below the seal system 126. FIG. 1 shows the system 200 positioned in the open volume of the bore 116 of the casing 112, and connected to a production string of tubing (also referred as production tubing 128) in the well 100. The wall of the well 100 includes the interior wall of the casing 112 in portions of the wellbore having the casing 112, and includes the open hole wellbore wall in uncased portions of the well 100. Thus, the seal system 126 is configured to seal against the wall of the wellbore, for example, against the interior wall of the casing 112 in the cased portions of the well 100 or against the interior wall of the wellbore in the uncased, open hole portions of the well 100. In certain instances, the seal system 126 can form a gas- and liquid-tight seal at the pressure differential the system 200 creates in the well 100. For example, the seal system 126 can be configured to at least partially seal against an interior wall of the wellbore to separate (completely or substantially) a pressure in the well 100 downhole of the seal system 126 from a pressure in the well 100 uphole of the seal system 126. For example, the seal system 126 includes a production packer. Although not shown in FIG. 1, additional components, such as a surface pump, can be used in conjunction with the system 200 to boost pressure in the well 100.

In some implementations, the system 200 can be implemented to alter characteristics of a wellbore by a mechanical intervention at the source. Alternatively, or in addition to any of the other implementations described in this specification, the system 200 can be implemented in a direct well-casing deployment for production through the wellbore. Other implementations of the system 200 can be utilized in conjunction with additional pumps, compressors, or multiphase combinations of these in the well bore to effect increased well production.

The artificial lift system 200 locally alters the pressure, temperature, and/or flow rate conditions of the fluid in the well 100 proximate the system 200. In certain instances, the alteration performed by the system 200 can optimize or help in optimizing fluid flow through the well 100. As described previously, the system 200 creates a pressure differential within the well 100, for example, particularly within the locale in which the system 200 resides. In some instances, a pressure at the base of the well 100 is a low pressure (for example, sub-atmospheric); so unassisted fluid flow in the wellbore can be slow or stagnant. In these and other instances, the system 200 introduced to the well 100 adjacent the perforations can reduce the pressure in the well 100 near the perforations to induce greater fluid flow from the subterranean zone 110, increase a temperature of the fluid entering the system 200 to reduce condensation from limiting production, and/or increase a pressure in the well 100 uphole of the system 200 to increase fluid flow to the surface 106.

The system 200 moves the fluid at a first pressure downhole of the system 200 to a second, higher pressure uphole of the system 200. The system 200 can operate at and maintain a pressure ratio across the system 200 between the second, higher uphole pressure and the first, downhole pressure in the wellbore. The pressure ratio of the second pressure to the first pressure can also vary, for example, based on an operating speed of the system 200. The system 200 can operate at a variety of speeds, for example, where operating at higher speeds increases fluid flow, and operating at lower speeds reduces fluid flow. Specific operating speeds for the system 200 can be defined based on the fluid (in relation to its composition and physical properties) and flow conditions (for example, pressure, temperature, and flow rate) for the well parameters and desired performance. Speeds can be, for example, as low as 1,000 rpm or as high as 12,000 rpm. While the system 200 can be designed for an optimal speed range at which the system 200 performs most efficiently, this does not prevent the system 200 from running at less efficient speeds to achieve a desired flow for a particular well, as well characteristics change over time.

The system 200 can operate in a variety of downhole conditions of the well 100. For example, the initial pressure within the well 100 can vary based on the type of well, depth of the well 100, production flow from the perforations into the well 100, and/or other factors. In some examples, the pressure in the well 100 proximate a bottomhole location is sub-atmospheric, where the pressure in the well 100 is at or below about 14.7 pounds per square inch absolute (psia), or about 101.3 kiloPascal (kPa). The system 200 can operate in sub-atmospheric well pressures, for example, at well pressure between 2 psia (13.8 kPa) and 14.7 psia (101.3 kPa). In some examples, the pressure in the well 100 proximate a bottomhole location is much higher than atmospheric, where the pressure in the well 100 is above about 14.7 pounds per square inch absolute (psia), or about 101.3 kiloPascal (kPa). The system 200 can operate in above atmospheric well pressures, for example, at well pressure between 14.7 psia (101.3 kPa) and 5,000 psia (34,474 kPa).

Referring to FIG. 2, the system 200 includes a stator 210 and a rotor 220. The stator 210 is configured to drive the rotor 220 in response to receiving power (for example, power supplied via an electrical line from a remote location). The stator 210 and rotor 220 together make up the downhole-type motor of the system 200. The stator 210 is described in more detail later. The rotor 220 can include a central rotating shaft 402 and impellers 432 (shown later in FIG. 4). The rotor 220 with the central shaft 402 and one or more impellers 432 can be called a rotor-impeller. In some implementations, the rotor 220 is free of electrical components. After installation of the system 200 in the well 100, the rotor 220 can optionally be retrieved from the well 100 while the stator 210 remains within the well 100. The stator 210 and the rotor 220 of the system 200 can be installed in the well 100 separately (physically and temporally). For example, the stator 210 can be installed in the well 100, and then the rotor 220 can be installed in the well 100. In some implementations, once the rotor 220 is positioned at a desired location within the well 100, the rotor 220 can be coupled to the stator 210 or a tubing of the well 100 (such as the production tubing 128) by a coupling part (not shown). Then, if desired, the rotor 220 can be decoupled from the stator 210 or the production tubing 128 and be retrieved from the well 100, while the stator 210 remains in the well 100.

As shown in FIG. 2, the rotor 220 can be disposed within an inner bore of the stator 210, and there can be an air gap between the stator 210 and the rotor 220. The air gap can be unsealed and of sufficient size to allow fluid flow through the system 200. The system 200 can include various protective sleeves (described in more detail later) to prevent components from being exposed to (and therefore protect them from) the production fluid. In some implementations, the rotor 220 interacts magnetically with the stator 210 and is not mechanically connected to the stator 210.

The system 200 can be exposed to production fluid from the subterranean zone 110. The rotation of the rotor 220 can induce fluid flow in the well 100 (for example, from the subterranean zone 110 to the surface 106). In some implementations, the system 200 can allow production fluid from the subterranean zone 110 to flow over an outer surface of the rotor 220. In some implementations, production fluid from the subterranean zone 110 flows through the annulus between the rotor 220 and the stator 210. In some implementations, production fluid from the subterranean zone 110 can flow through an inner bore of the rotor 220.

The system 200 can include a protector configured to protect a portion of the rotor 220 against contamination of production fluid. The protector can include a thrust bearing, such as a mechanical thrust bearing or a magnetic thrust bearing with or without permanent magnets. The shaft 402 running through the protector can be coupled to the rotor 220 and also to the impellers 432, such that the shaft 402 and impellers 432 rotate with the rotating rotor 220. The protector can include face seals that prevent fluid from entering or exiting the protector. The protector can be filled with lubrication fluid (for example, lubrication oil)—that is, the thrust bearing can be submerged in lubrication fluid. In some implementations, the protector (including one or more thrust bearings) is located at one end of the system 200, for example, at a downhole end of the system 200. In such implementations, one end of the protector can be capped and the other end of the protector can be coupled to the rotor 220. Such implementations can require only one set of seals (at the mating of the protector and the rotor 220), in contrast to configurations in which the protector is located between the pump section (the portion of the system 200 including the impellers 432) and the motor section (such configurations can require two sets of seals: one set at the mating of the protector and the pump section and another set at the mating of the protector and the motor section).

Figure 3:
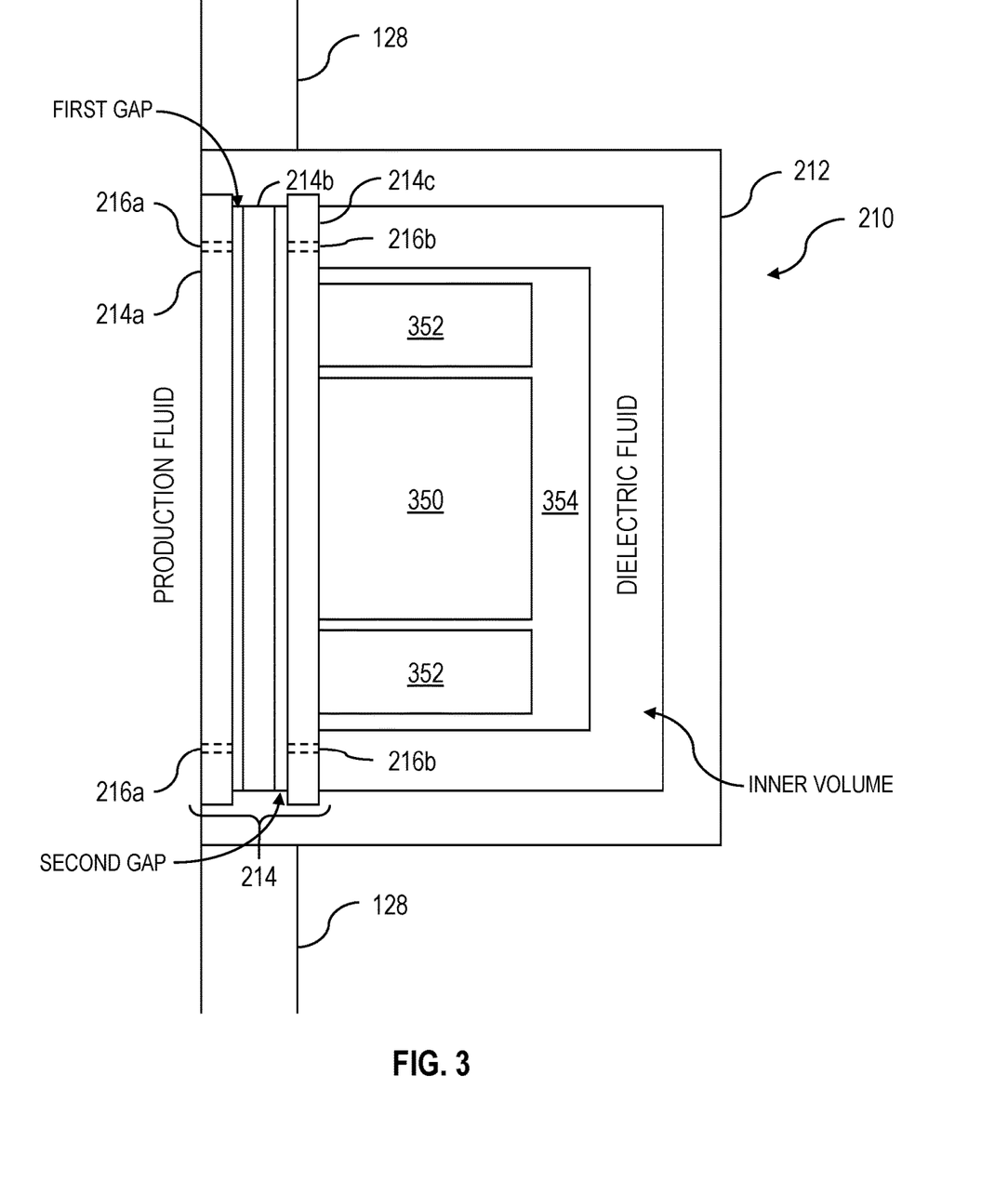
FIG. 3 is a cross section of the artificial lift system of FIG. 2.

FIG. 3 shows a cross-section of the stator 210. The stator 210 includes a housing 212. The housing 212 can be configured to resist corrosion. The housing 212 includes an inner circumferential sleeve 214 that defines an inner bore of the housing 212 within which the rotor 220 can be disposed (as shown in FIG. 2). The sleeve 214 includes a first layer 214a, a second layer 214b, and a third layer 214c. The stator 210 also includes a motor stack 350. The motor stack 350 is configured to drive the rotor 220 that is disposed within the inner bore of the housing 212.

When the rotor 220 is positioned within the inner bore of the housing 212, the sleeve 214 can be exposed to an alternating magnetic field because the sleeve 214 is positioned between the rotor 220 and the motor stack 350 of the stator 210. If the whole sleeve 214 or a substantial portion of the sleeve 214 is made of a magnetically conductive material (for example, iron), the sleeve 214 would conduct the magnetic field and prevent the magnetic field from reaching the stator 210 and/or rotor 220 and would therefore reduce performance of the system 200. Utilizing non-magnetic materials for constructing the sleeve 214 can therefore be beneficial for not only performance, but also size of the system 200. If the whole sleeve 214 or a substantial portion of the sleeve 214 is made of an electrically conductive material, such as 300 series stainless steel, the alternating magnetic field of the system 200 would induce eddy currents in the sleeve 214. Such eddy currents can generate magnetic fields that oppose the magnetic field of the system 200, thereby reducing field density of the system 200 and increasing losses. Increasing the thickness of the sleeve 214 can exacerbate such issues, as the generation of eddy current losses are generally proportional to the square of thickness of the material (as well as the square of flux density and the square of frequency of the magnetic field). Implementing the sleeve 214 as described in this disclosure can mitigate or prevent the aforementioned issues. The various layers (214a, 214b, 214c) of the sleeve 214 can be made of different materials to provide a variety of characteristics that can work together to improve performance of the system 200. The various layers (214a, 214b, 214c) of the sleeve 214 can have different thicknesses, depending on the respective material of construction and desired characteristics of the sleeve 214.

The first layer 214a forms an inner circumferential wall of the inner bore of the housing 212. The first layer 214a is configured to resist erosion and can be exposed to production fluid flowing through the inner bore of the housing 212. The first layer 214a can define a passage 216a that is configured to allow flow of production fluid through the first layer 214a. The passage 216a can also be configured to prevent flow of solids (for example, debris carried by the production fluid) through the first layer 214a. The first layer 214a can protect the other layers (214b and 214c) and the inner volume of the stator 210 from solids that may be flowing with the production fluid. As shown in FIG. 3, the first layer 214a can define multiple passages 216a. The first layer 214a is made of a material that is non-conductive and resistant to erosive effects of solids that may be flowing with the production fluid. The material that makes up the first layer 214a can also be chemically inert with respect to the production fluid, thereby providing resistance to corrosion. In some implementations, the first layer 214b is made of a non-metallic material, such as ceramic or concrete.

The second layer 214b is configured to resist corrosion. The second layer 214b and the housing 212 together define an inner volume of the stator 210. As shown in FIG. 3, the inner volume of the stator 210 can be flooded with a dielectric fluid. The second layer 214b is configured to isolate production fluid that is flowing through the inner bore of the housing 212 from the dielectric fluid that floods the inner volume of the stator 210 (and any other components that reside in the inner volume of the stator 210). The dielectric fluid can conduct heat (for example, that is generated while the system 200 operates). The dielectric fluid can also serve as a way to compensate/equalize pressure between the inner volume within the housing 212 and the environment in which the housing 212 resides. The stator 210 can include a pressure compensator (not shown) that can compensate for volume changes of the dielectric fluid due to, for example, thermal expansion and contraction due to changes in pressure.

In some implementations, the second layer 214b is made of an electrically conductive material, such as Inconel. When the second layer 214b is made of electrically conductive material, heat can be generated from eddy current losses when the system 200 is operating. In some implementations, the eddy current losses can be reduced by reducing the thickness of the second layer 214b. For example, in some implementations, the thickness of the second layer 214b is in a range of from 0.004 inches to 0.015 inches. Acceptable levels of eddy current losses can depend on the frequency of the motor magnetic field. Another option to reduce the generation of eddy current losses is to select a material with increased electrical resistivity, for example, titanium. The second layer 214b can be coupled to the housing 212 via metal-to-metal sealing, such that the inner volume of the stator 210 is hermetically sealed from the surrounding environment in which the stator 210 resides. For example, the second layer 214b can be welded to the housing 212. Such welding eliminates sealing failures that are commonly associated with elastomer seals. In some implementations, the second layer 214b and the housing 212 are made of the same material (for example, Inconel). In some implementations, the second layer 214b can be made of a non-metallic material that can be adequately sealed to the housing 212, for example, ceramic or polyether ether ketone (PEEK). If a non-metallic material is selected for the second layer 214b, the material should provide corrosion resistance and allow for robust seal connections to the housing 212 that are tolerant to thermal differential growth between the second layer 214b and the housing 212.

The third layer 214c is disposed within the inner volume of the stator 210. The third layer 214c is configured to provide structural support. The third layer 214c can define a passage 216b that is configured to allow flow of dielectric fluid through the third layer 214c. As shown in FIG. 3, the third layer 214c can define multiple passages 216b. The one or more passages 216b allow the dielectric fluid to be at the same pressure throughout the inner volume of the stator 210. The third layer 214c can be made of a non-conductive material. In some implementations, the third layer 214c is made of carbon fiber, fiber glass, or PEEK.

As shown in FIG. 3, the first layer 214a and the second layer 214b are separated by a gap, and the second layer 214b and the third layer 214c are separated by a gap. The gaps allow for the second layer 214b to be pressure compensated between the production fluid and the dielectric fluid. The gaps between the layers should not be too large, so that the second layer 214b does not deform excessively due to fluctuating differential pressure between the production fluid and the dielectric fluid. When the pressure of the production fluid is greater than the pressure of the dielectric fluid at a certain instance, the second layer 214b can deform toward the third layer 214c. When the pressure of the production fluid is less than the pressure of the dielectric fluid at a certain instance, the second layer 214b can deform toward the first layer 214a. In either scenario, the third layer 214c provides enough structural and mechanical support, so that deformation of the second layer 214b is limited and does not exceed its yield limit or push against another other components, such as the motor stack 350 or magnetic bearings 352.

The motor stack 350 is disposed within the inner volume of the stator 210. In some implementations, the motor stack 350 includes an electromagnetic coil. In response to receiving power, the motor stack 350 can generate a magnetic field to engage the rotor 220 and cause the rotor 220 to rotate. The motor stack 350 and the rotor 220 interact magnetically. For example, the motor stack 350 and the rotor 220 can each generate magnetic fields which attract or repel each other. The attraction or repulsion imparts forces that cause the rotor 220 to rotate. The stator 210 and the rotor 220 can be designed such that corresponding components are located near each other. For example, the motor stack 350 is in the vicinity of a motor permanent magnet of the rotor 220. As one example, the motor stack 350 can be constructed similar to a permanent magnet motor stator, including laminations with slots filled with coil sets constructed to form three phases with which a produced magnetic field can be sequentially altered to react against a motor permanent magnetic field and impart torque on a motor permanent magnet, thereby causing the rotor 220 to rotate.

The stator 210 can include a magnetic bearing 352 is disposed within the inner volume of the stator 210. The magnetic bearing 352 is configured to control a position of the rotor 220 relative to the stator 210 during rotation of the rotor 220. The stator 210 can include duplicate components. For example, as shown in FIG. 3, the stator 210 can include two magnetic bearings 352. Each of the magnetic bearings 352 can include a permanent magnet (passive control) or an electromagnetic coil (active control). One or more of the magnetic bearings 352 can be magnetic thrust bearings, and one or more of the magnetic bearings 352 can be magnetic radial bearings. The magnetic bearings 352 in the stator 210 are magnetic bearing actuators that can magnetically interact with magnetic bearing targets that are part of the rotor 220. The magnetic interaction between the actuators and targets (attraction and/or repulsion) controls the position of the rotating rotor 220 relative to the stator 210 during operation of the system 200.

As shown in FIG. 3, the motor stack 350 and the magnetic bearings 352 can be potted. In some implementations, the motor stack 350 and the magnetic bearings 352 are potted in a thermally conductive potting material 354, such as silicone, epoxy, or urethane-based encapsulation material. The thermally conductive potting material 354 can dissipate heat that is generated while the system 200 operates.

Figure 4:
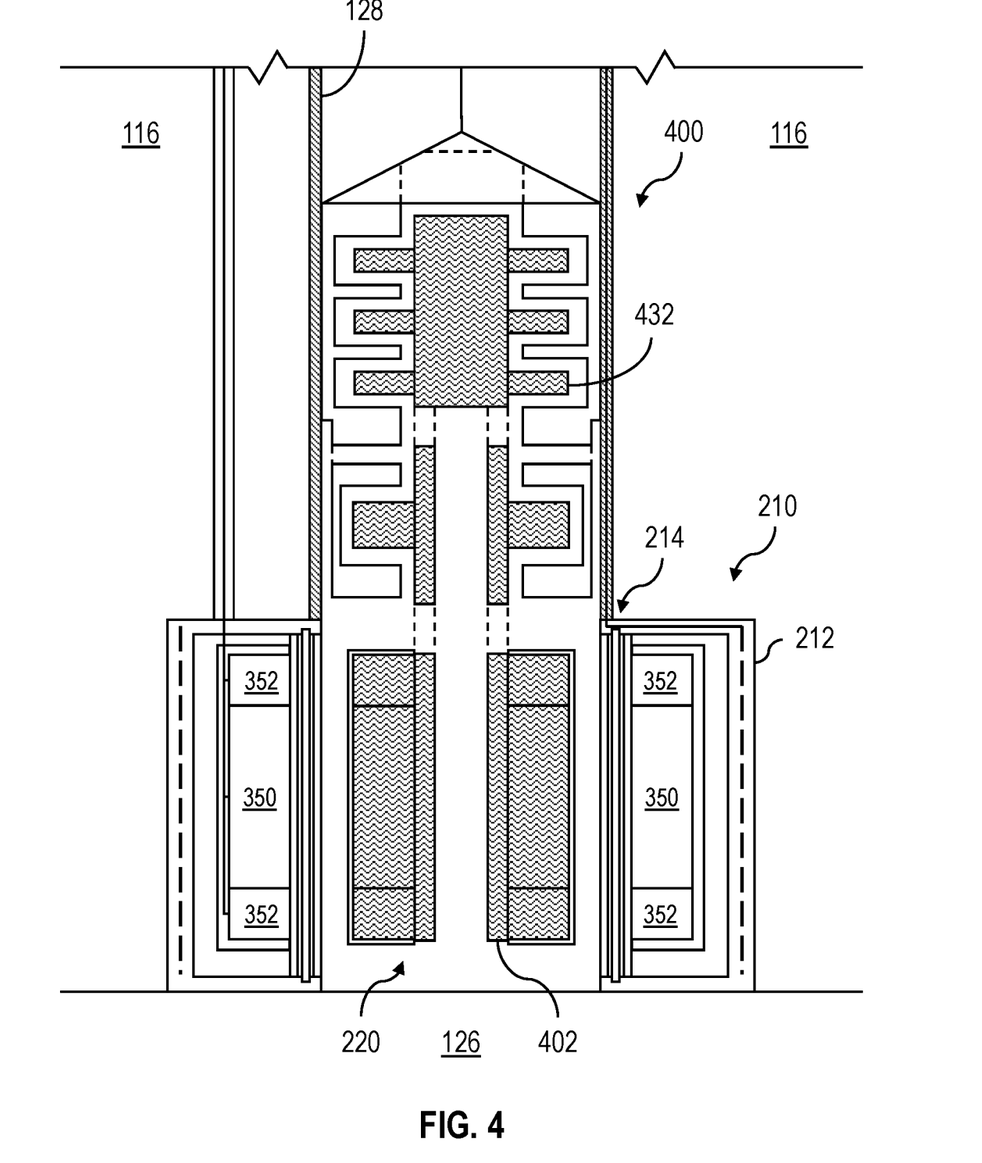
FIG. 4 is a cross section of the artificial lift system of FIG. 2.

FIG. 4 illustrates an example ESP 400 that includes implementations of the stator 210 and the rotor 220. The stator 210 can include one or more thrust bearing actuators. The thrust bearing actuators can be, for example, thrust bearing permanent magnets (passive) or thrust bearing electromagnetic coils (active). In the case of thrust bearing electromagnetic coils, the thrust bearing actuators can be connected to topside circuitry, for example, by a cable running through the annulus 116. The stator 210 can include one or more radial bearing actuators. The radial bearing actuators can be, for example, radial bearing permanent magnets (passive) or radial bearing electromagnetic coils (active). In the case of radial bearing electromagnetic coils, the radial bearing actuators can be connected to topside circuitry, for example, by the cable running through the annulus 116. In some implementations, the thrust bearing actuators and the radial bearing actuators are connected to a magnetic bearing controller located at the surface 106.

The rotor 220 can include one or more thrust bearing targets. The thrust bearing targets can be, for example, metallic stationary poles (solid or laminated), rotating metallic poles (solid or laminated), and/or permanent magnets. The rotor 220 can include one or more radial bearing targets. The radial bearing targets can be, for example, metallic stationary poles (solid or laminated), rotating metallic poles (solid or laminated), and/or permanent magnets. The thrust bearing targets and the radial bearing targets can both be comprised of stationary components (for example, for conducting magnetic fields in a specific path) and rotating components. For example, the thrust bearing target can include a solid metallic pole that conducts a magnetic field from a stator coil (such as the magnetic bearing 352). The magnetic field from the stator coil (352) is radial, and the solid metallic pole (of the thrust bearing target) can conduct the radial magnetic field to an axial magnetic field, at which point the magnetic field crosses a gap between a stationary pole and a rotating pole, thereby imparting a force between the stationary pole and the rotating pole.

As shown in FIG. 4, the stator 210 is spaced from the rotor 220 to define an air gap between the stator 210 (which can include the thrust bearing actuators and the radial bearing actuators) and the rotor 220 (which can include the thrust bearing targets and the radial bearing targets). The air gap can be unsealed and of sufficient size to allow fluid flow through the air gap between the bearing actuators and the bearing targets of the ESP 400. The thrust bearing targets and the radial bearing targets are coupled to the rotor 220 and can be covered by the protective sleeve. The protective sleeve can prevent the bearing targets and the motor permanent magnet from being exposed to production fluid.

As shown in FIG. 4, the electrical components and electric cables of the ESP 400 can be reserved for the stator 210, and the rotor 220 can be free of electrical components and electric cables. Various components of stator 210 (such as the motor stack 350 and the magnetic bearings 352) are sources of magnetic flux and can include electrical components. The generated magnetic fluxes can interact with targets (for example, a permanent magnet) to achieve various results, such as rotation of the rotor 220, translation in the case of a linear motor, control of axial position of the rotor 220 with respect to the stator 210, and control of radial position of the rotor 220 with respect to the stator 210.

The thrust bearing actuators and the thrust bearing targets are cooperatively configured to counteract axial (thrust) loads on the rotor 220. The thrust bearing actuators and the thrust bearing targets work together to control an axial position of the rotor 220 relative to the stator 210. For example, the thrust bearing actuators and the thrust bearing targets interact magnetically (that is, generate magnetic fields to exert attractive or repulsive magnetic forces) to maintain an axial position of the rotor 220 relative to the stator 210 while the rotor 220 rotates.

Similarly, the radial bearing actuators and the radial bearing targets are cooperatively configured to counteract radial loads on the rotor 220. The radial bearing actuators and the radial bearing targets work together to control a radial position of the rotor 220 relative to the stator 210. For example, the radial bearing actuators and the radial bearing targets interact magnetically (that is, generate magnetic fields to exert attractive or repulsive magnetic forces) to maintain a radial position of the rotor 220 relative to the stator 210 while the rotor 220 rotates.

In some implementations, the ESP 400 includes a damper (for example, a passive damper and/or an active damper). The damper includes a stationary portion (which can include electrical components) that can be installed as a part of the stator 210. The damper includes a rotating portion (which can include a permanent magnet) that can be installed as a part of the rotor 220. A damper magnetic field can be generated by a permanent magnet rotating with the rotor 220. The damper can damp a vibration of the rotor 220. The damper can include a damper magnet positioned between or adjacent to the bearing actuators. The vibration of the rotor 220 can induce a vibration in the damper magnet. In some implementations, the damper magnet includes a first damper magnet pole shoe and a second damper magnet pole shoe coupled to a first pole (North) and a second pole (South), respectively. The first damper magnet pole shoe and the second damper magnet pole shoe can maintain uniformity of the magnetic fields generated by the damper magnet. In some implementations, a damper sleeve is positioned over the outer diameters of the damper magnet, the first damper magnet pole shoe, and the second damper magnet pole shoe.

In some implementations, for active dampers, one or more radial velocity sensing coils can be placed in a plane adjacent to the first damper magnet pole shoe and coupled to the first pole of the damper magnet. The one or more radial velocity sensing coils can be installed as a part of the stator 210 and be exposed to a magnetic field emanating from the first pole of the damper magnet. Radial movement of the damper magnet can induce an electrical voltage in the one or more radial velocity sensing coils. The damper magnet can face the one or more radial velocity sensing coils with the first pole. In some implementations, a second damper sensing magnet is positioned axially opposite the one or more radial velocity sensing coils and oriented to face the one or more radial velocity sensing coils with a pole opposite the first pole. A printed circuit board can include the one or more radial velocity sensing coils.

For active dampers, one or more radial damper actuator coils can be placed in a second plane adjacent to the second damper magnet pole shoe and coupled to the second pole of the damper magnet. The one or more radial damper actuator coils can be installed as a part of the stator 210 and be exposed to a magnetic field emanating from the second pole of the damper magnet. An electrical current in the one or more radial damper actuator coils can cause a force to be exerted on the damper magnet. The damper magnet can face the one or more radial damper actuator coils with the second pole. In some implementations, a second damper sensing magnet is positioned axially opposite the one or more radial damper actuator coils and oriented to face the one or more radial damper actuator coils with a pole opposite the second pole. A printed circuit board can include the one or more radial damper actuator coils.

As shown in FIG. 4, the electrical components of the ESP 400 are positioned in the portions related to the stator 210, and electric cables run through the annulus 116 which can be filled with completion fluid including corrosion inhibitor. In this way, the electrical components can be isolated from the producing portion of the well 100, which can contain fluids that are potentially damaging to the cables (for example, by corrosion, abrasion, or erosion).

The system 200 can include additional components. Components of the stator 210 and components of the rotor 220 can be cooperatively configured to counteract a mechanical load experienced by the system 200 during rotation of the rotor 220. In some implementations, the system 200 includes duplicate components (such as multiple rotors 220) that can act together or independently to provide higher output or redundancy to enhance long-term operation. In some implementations, multiple systems 200 can be deployed to act together or independently to provide higher output or redundancy to enhance long-term operation.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A downhole-type motor comprising a stator comprising:
   a housing having an inner circumferential sleeve that defines an inner bore of the housing, the inner circumferential sleeve comprising:
   a first layer forming an inner circumferential wall of the inner bore of the housing, wherein the first layer is configured to resist erosion and configured to be exposed to a production fluid flowing through the inner bore of the housing, and the first layer defines a first passage that allows a flow of the production fluid to flow through the first layer and prevents a flow of solids through the first layer;
   a second layer configured to resist corrosion, wherein the second layer and the housing together define an inner volume, wherein the inner volume is flooded with a dielectric fluid, and the second layer is configured to isolate the production fluid flowing through the inner bore of the housing from the dielectric fluid that is flooding the inner volume; and
   a third layer disposed within the inner volume and configured to provide a structural support, wherein the first and second layers are separated by a first gap, the second and third layers are separated by a second gap, and the third layer defines a second passage that allows a flow of the dielectric fluid to flow through the third layer; and
   a motor stack disposed within the inner volume, the motor stack configured to drive a rotor of the downhole-type motor when the rotor is disposed within the inner bore of the housing.

2. The stator of claim 1, further comprising a magnetic bearing disposed within the inner volume, the magnetic bearing configured to control a position of the rotor relative to the stator during a rotation of the rotor.

3. The stator of claim 1, wherein the second layer has a thickness in a range of from 0.004 inches to 0.015 inches.

4. The stator of claim 3, wherein the second layer is made of Inconel, titanium, or a non-metallic material.

5. The stator of claim 3, wherein the second layer is welded to the housing.

6. The stator of claim 1, wherein the first layer is made of ceramic.

7. The stator of claim 1, wherein the third layer is made of carbon fiber.

8. The stator of claim 2, wherein the motor stack and the magnetic bearing are potted with thermally conductive material.

9. A downhole-type motor, comprising:
   a rotor comprising a permanent magnet; and
   a stator comprising:
   a housing comprising a sleeve that defines an inner bore of the housing, the sleeve comprising:
   a first layer forming an inner circumferential wall of the inner bore of the housing, wherein the first layer is configured to resist erosion and configured to be exposed to a production fluid flowing through the inner bore of the housing, and the first layer defines a first passage that allows a flow of the production fluid to flow through the first layer and prevents a flow of solids through the first layer;

a second layer configured to resist corrosion, wherein the second layer and the housing together define an inner volume, wherein the inner volume is flooded with a dielectric fluid, and the second layer is configured to isolate the production fluid flowing through the inner bore of the housing from the dielectric fluid that is flooding the inner volume; and a third layer disposed within the inner volume and configured to provide a structural support, wherein the first and second layers are separated by a first gap, the second and third layers are separated by a second gap, and the third layer defines a second passage that allows a flow of the dielectric fluid to flow through the third layer; and a motor stack disposed within the inner volume, the motor stack configured to drive the rotor when the rotor is disposed within the inner bore of the housing.

10. The downhole-type motor of claim 9, wherein the stator comprises a magnetic bearing disposed within the inner volume, the magnetic bearing configured to control a position of the rotor relative to the stator during a rotation of the rotor.

11. The downhole-type motor of claim 9, wherein the stator is configured to be permanently installed within a well, and the rotor is retrievable from the well while the stator remains within the well.

12. The downhole-type motor of claim 11, wherein the second layer has a thickness in a range of from 0.004 inches to 0.015 inches.

13. The downhole-type motor of claim 12, wherein the second layer is made of Inconel, titanium, or a non-metallic material.

14. The downhole-type motor of claim 13, wherein the first layer is made of ceramic, and the third layer is made of carbon fiber.

15. The downhole-type motor of claim 10, wherein the motor stack and the magnetic bearing are potted with thermally conductive material.

* * * * *